United States Patent [19]
Cullen et al.

[11] Patent Number: 5,669,347
[45] Date of Patent: Sep. 23, 1997

[54] INTAKE SYSTEM FOR AN INTERNAL COMBUSTION ENGINE

[75] Inventors: Michael John Cullen, Northville; Bruce Allen Meek, Highland; Kevin Joseph Rzemien, Warren, all of Mich.

[73] Assignee: Ford Global Technologies, Inc., Dearborn, Mich.

[21] Appl. No.: 687,898

[22] Filed: Jul. 29, 1996

[51] Int. Cl.[6] .................................................. F02B 31/00
[52] U.S. Cl. .......................... 123/306; 123/308; 123/406
[58] Field of Search ................................. 123/306, 308, 123/432, 442, 406, 417

[56] References Cited

U.S. PATENT DOCUMENTS

| | | | |
|---|---|---|---|
| 3,999,524 | 12/1976 | Kobayashi et al. | 123/328 |
| 4,232,640 | 11/1980 | Matsumoto et al. | 123/308 |
| 4,270,500 | 6/1981 | Nakagawa et al. | 123/308 |
| 4,561,394 | 12/1985 | Kishida et al. | 123/680 |
| 4,834,048 | 5/1989 | Adamis et al. | 123/432 |
| 4,892,071 | 1/1990 | Asayama | 123/336 |
| 5,168,954 | 12/1992 | Nakaniwa et al. | 180/197 |
| 5,267,543 | 12/1993 | Novak et al. | 123/306 |
| 5,273,014 | 12/1993 | Mitobe et al. | 123/336 |
| 5,309,880 | 5/1994 | Mazzella et al. | 123/306 |
| 5,415,142 | 5/1995 | Tsubakiji et al. | 123/336 |
| 5,435,184 | 7/1995 | Shimizu et al. | 123/396 |
| 5,515,826 | 5/1996 | Hamburg et al. | 123/421 |
| 5,522,360 | 6/1996 | Suzuki et al. | 123/308 X |

*Primary Examiner*—Tony M. Argenbright
*Attorney, Agent, or Firm*—Neil P. Ferraro

[57] ABSTRACT

An intake system for a multicylinder internal combustion engine includes a manifold having inlet runners for conducting charge air into the cylinders of an engine, and at least one secondary throttle valve situated within at least one of the inlet runners. An actuator positions the secondary throttle valve, with the actuator being operated by a controller. The controller receives a sensed value from at least one engine operating parameter sensor, determines an appropriate position for the secondary throttle valve and predicts an optimum transition point at which the secondary throttle valve transitions to the appropriate position. The controller then initiates operation of the actuator at a point before the transition point such that the engine smoothly transitions between a first operating condition and a second operating condition.

20 Claims, 3 Drawing Sheets

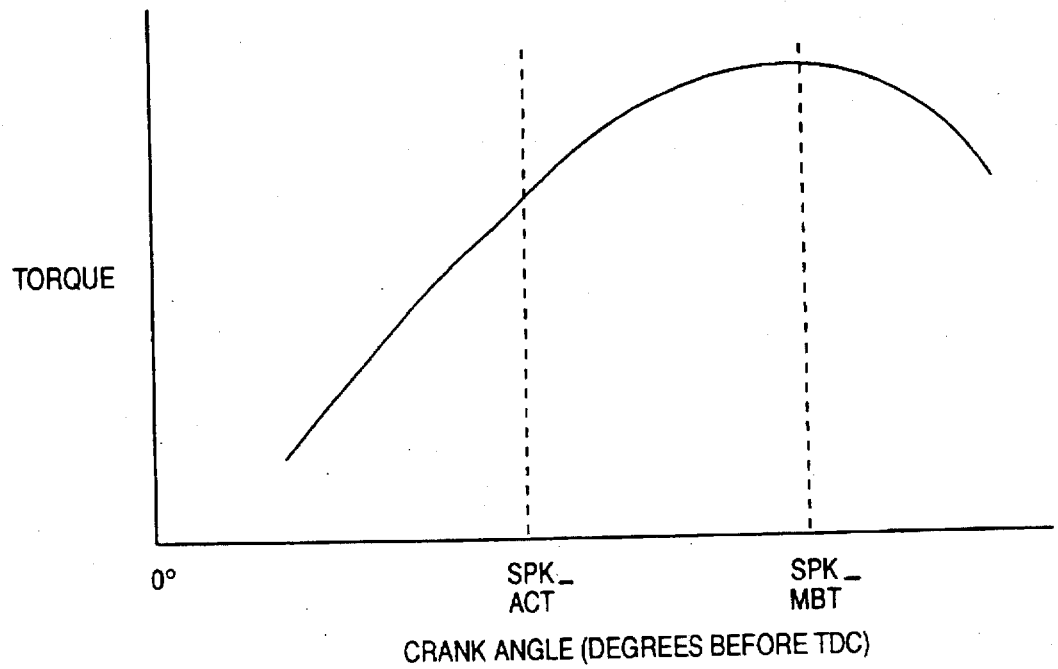
FIG.4
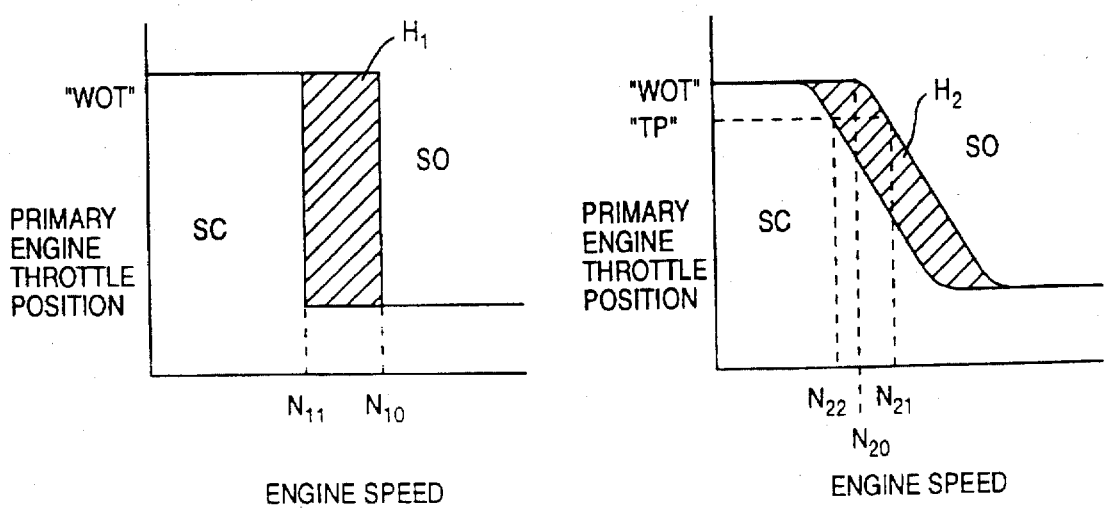
FIG.5
FIG.6

INTAKE SYSTEM FOR AN INTERNAL COMBUSTION ENGINE

FIELD OF THE INVENTION

This invention relates to an intake system for an internal combustion engine, and, more particularly to, a system for controlling a secondary throttle valve in one of the inlet runners of the intake system.

BACKGROUND OF THE INVENTION

Variable geometry intake systems employing deactivatable ports are desirably used for controlling burn rate by allowing a primary port passage to remain open at all times, while having secondary port passages which may be deactivated. Such deactivation has been accomplished by means of throttle valves in the secondary ports. This throttle valve generally has two positions—"SC" for secondary closed and "SO" for secondary open. With the "SC" position, swirl is induced in the air charge thus increasing the combustion burn rate in the cylinder, improving tolerance to lean air/fuel mixtures and increasing torque and fuel economy at a given oxides of nitrogen ($NO_x$) level. However, as is well known to those skilled in the art, imparting an angular momentum on the air charge usually reduces the volumetric efficiency at relatively high engine speeds. For peak torque at high engine speeds, then the secondary throttle valve is switched to the "SO" position.

To determine when to switch from the "SC" position to the "SO" position, prior art systems typically utilize engine speed. That is, at a discrete engine speed, the secondary throttle valve moves between the "SC" and "SO" positions.

The inventors of the present invention have found certain disadvantages with prior art systems. For example, a finite time delay exists between the time when the secondary throttle is commanded to move between the "SC" and "SO" positions and the time when the secondary throttles actually move. If, for example, the vehicle is accelerating, this time delay may cause the secondary throttles to open when the engine is operating past the optimum switch point, thereby causing undesirable drivability. That is, a torque bump or spike may occur when the engine transitions between a first, relatively low speed operating condition and a second, relatively high speed operating condition.

Another disadvantage with prior art systems is the failure to recognize that the optimum switch point changes with changes in ambient air and engine temperature. As previously stated, failing to switch at the optimum point results in an undesirable torque bump.

Additionally, the inventors of the present invention have found that the prior art systems suffer from alternately switching between "SC" and "SO" if the engine is operating near the optimum switch point. This phenomenon is termed "hunting" and should be avoided.

In general, it is desirable to make the transition between the "SC" and "SO" positions as smooth as possible. This will assure that the positive effects of such a system, such as burn rate control and high tolerance for exhaust gas recirculation at low and moderate engine loads, will be achieved while at the same time allowing high power operation with both the primary and secondary runners open.

SUMMARY OF THE INVENTION

An object of the present invention is to provide a smooth transition between the "SC" and "SO" positions while reducing the possibility of "hunting" between positions.

This object is achieved and disadvantages of prior art approaches overcome by providing a novel intake system for a multicylinder internal combustion engine. In one particular aspect of the invention, the system includes a manifold having a plurality of inlet runners for conducting charge air into the cylinders of an engine and at least one secondary throttle valve situated within an inlet runner. The system also includes an actuator for positioning the secondary throttle valve and at least one sensor for sensing at least one operating parameter of the engine. A controller operates the actuator so as to move the secondary throttle valve between a first, relatively restricting position, and a second, relatively unrestricting position. The controller receives a sensed value from the sensor, determines an appropriate position for the secondary throttle valve and predicts an optimum transition point at which the secondary throttle valve transitions to the appropriate position. The controller then initiates operation of the actuator at a point before the optimum transition point such that the engine smoothly transitions between engine operating conditions.

The intake system also includes an engine speed sensor for sensing engine speed. The controller predicts the optimum transition point by receiving sensed values from the engine speed sensor indicative of engine speeds and calculates a rate of change of engine speed over time based on the sensed values. The controller then calculates an engine speed representing the point before the transition point when the controller initiates operation of the actuator.

The controller may also determine whether the calculated engine speed is increasing or decreasing. The controller operates the actuator so as to move the secondary throttle valve between the "SC" and "SO" positions such that the point before the transition point when the controller operates the actuator is different depending upon whether the engine speed is increasing or decreasing so as to form a hysteresis.

In addition, the optimum transition point may be altered depending upon ambient air and engine temperature. The controller alters the optimum transition point based on a difference between the actual delivered ignition timing and the optimal ignition timing for best torque.

An advantage of the present invention is that a smooth transition between engine operating conditions may be obtained.

Another advantage of the present invention is that the optimum transition point may be determined based on a variety of engine operating parameters.

Yet another advantage of the present invention is that peak engine torque can be produced at any engine speed, ambient air temperature and engine temperature.

Still another advantage of the present invention is that alternating between the secondary closed position and the secondary open position may be reduced.

Yet another advantage of the present invention is that peak torque with reduced $NO_x$ may be obtained.

Other objects, features, and advantages of the present invention will become apparent to the reader of this specification.

BRIEF DESCRIPTION OF THE DRAWINGS

The invention will now be described, by way of example, with reference to the accompanying drawings, in which:

FIG. 4 is a is a graph of torque versus ignition timing according to one aspect of the present invention; and, FIGS. 5 and 6 are graphs of primary engine throttle position versus engine speed according to two aspects of the present invention.

DETAILED DESCRIPTION OF THE PREFERRED EMBODIMENT

Figure 1:
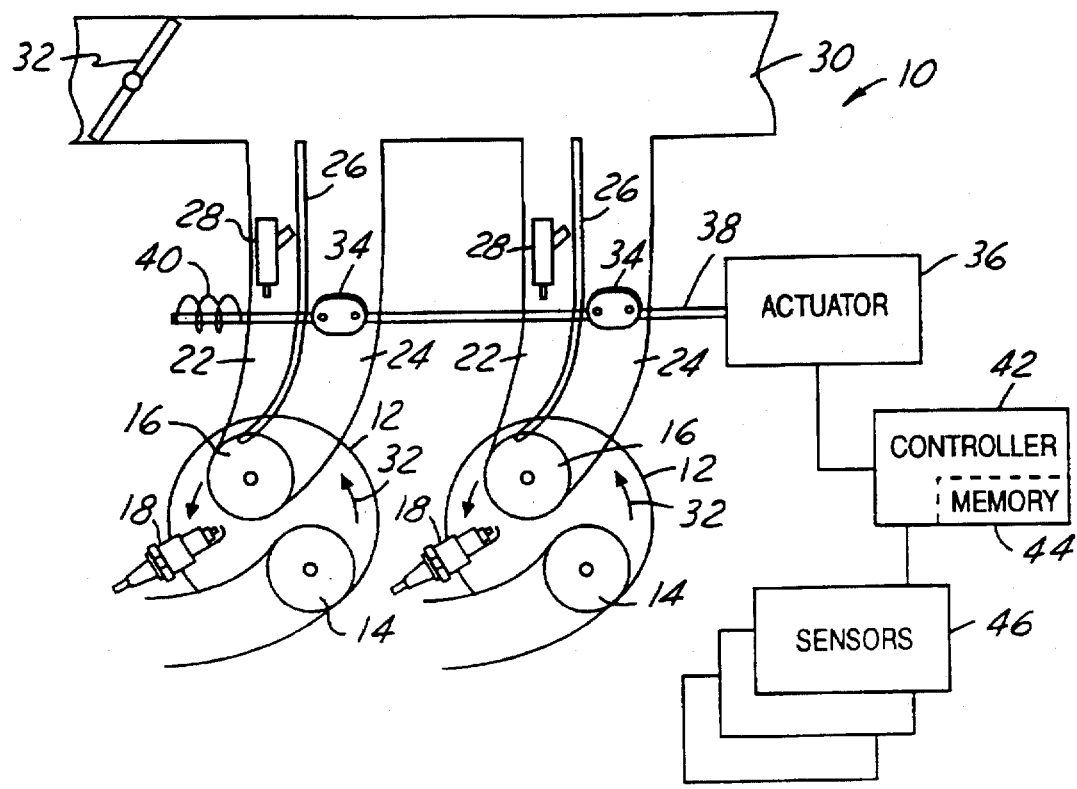
FIG. 1 is a schematic representation of an engine having an intake system according to the present invention.

Multicylinder reciprocating internal combustion engine 10 has a plurality of cylinders 12, which may be arranged either in an in-line configuration, as shown in FIG. 1, or in a V configuration or other configuration known to those skilled in the art and suggested by this disclosure. Engine 10 is equipped with exhaust valves 14 and one or more intake valves 16. Sparkplugs 18 initiate the combustion event. Intake ports of engine 10 comprise primary runners 22 and secondary runners 24, which feed each intake valve 16. The primary and secondary runners are defined in part by vertical dividing wall 26, which separates the runners and which extends entirely from the bottom to the top of the runners. Fuel injector 28 is disposed in primary runner 22 to inject fuel therein. In the example described herein, primary and secondary runners 22, 24 are fed by plenum 30, which is throttled by primary engine throttle valve 32. Alternatively, those skilled in the art will recognize in view of this disclosure that primary and secondary runners 22, 24 may be fed by separate plenums. In the case of a two intake valve configuration (not shown), runners 22, 24 may each have an intake valve, respectively. Flow through secondary runner 24 is controlled by secondary throttle valve 32 as will be further described hereinafter. As defined herein, the term "runner" refers to either the illustrated passages extending from a plenum to a cylinder, either directly, or a crossover passage between two plenums, or any of a plurality of passages used in intake systems of modern internal combustion engines.

The flow of charge through primary runners 22 produces a rotational flow about the outermost portion of each cylinder 12. This rotational flow, sometimes referred to as swirl, is counterclockwise, shown as arrow 32 as viewed in FIG. 1. Flow through secondary runners 24 causes much less swirl within cylinders 12 because the charge flows into a radially inward portion of cylinder 12. The reduced rotational impetus attributable to flow through runner 24 is acceptable because secondary throttle valves 34, which control flow through secondary runners 24, are opened at higher engine speeds which are accompanied by vigorous rotational flow produced by primary runners 22.

Secondary throttle valves 34 are operated by actuator 36, such as an electrically driven motor or an engine manifold vacuum driven motor. Actuator 36 drives secondary throttle valves 34 via shaft 38 and a geartrain (not shown). In a preferred embodiment, actuator 36 drives secondary throttle valves 34 to their fully open position and torsion spring 40 is used to return secondary throttle valves 34 to their closed position.

Continuing with FIG. 1, actuator 36 is controlled by controller 42 having memory storage device 44. A plurality of sensors 46 sense numerous engine operating parameters such as engine speed, engine load, spark timing, EGR rate, fuel delivery rate, engine air charge temperature, engine coolant temperature, intake manifold absolute pressure, the operating position of secondary throttle valves, the operating position of primary engine throttle valve, vehicle gear selection, vehicle speed, intake manifold air mass flow rate, accelerator position, and other parameters known to those skilled in the art and suggested by this disclosure.

Controller 42, which may comprise a conventional engine control microprocessor known to those skilled in the art, or a stand-alone processor, as desired, is charged with the task of operating actuator 36 so as to move secondary throttle valves 34 between "SC" and "SO". Controller 42 receives sensed values of engine operating parameters from sensors 46 and determines an appropriate position for secondary throttle valves 34 as will be further described hereinafter. According to the present invention, the opening and closing of secondary throttle valves 34 must be handled correctly in order to assure that objectionable torque spike or bump is not felt by the drivers and/or passengers of the vehicle. The inventors of the present invention have determined that in order to achieve the desired smoothing of torque output of the engine, a prediction of the optimum transition point must be made, with the actual transition beginning before reaching such optimum transition point.

Figure 2:
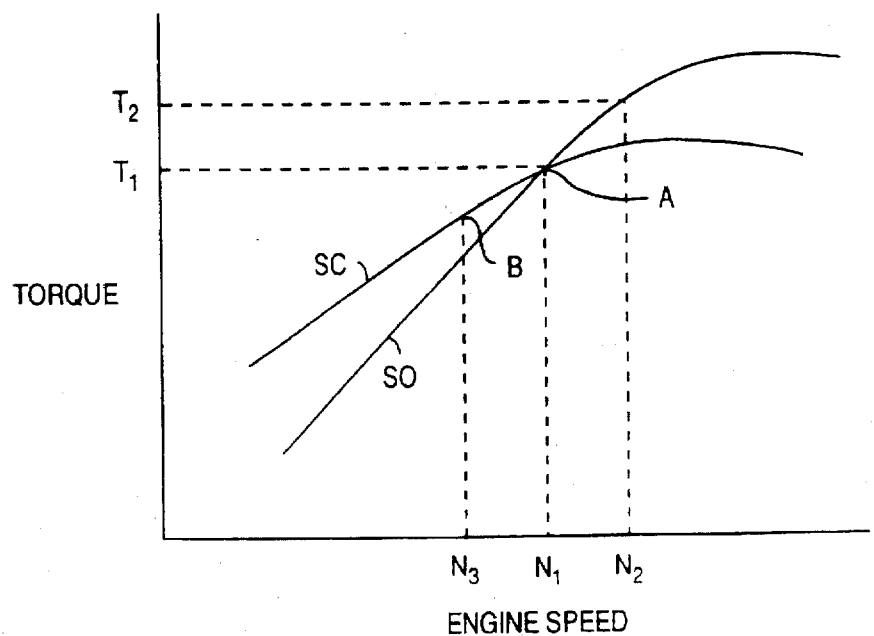
FIG. 2 is a graph of torque versus engine speed according to the present invention.

For example, referring to FIG. 2, a plot of torque versus engine speed for "SC" and "SO" is shown. At relatively low engine speeds, secondary throttle valves 34 are in the "SC" position; whereas at relatively high engine speeds, secondary throttle valves are moved to the "SO" position. In order for a smooth transition to occur between the two torque curves shown, the optimum transition point must occur where the two curves intersect, shown at point "A" in FIG. 2. As previously described, if engine speed is increasing and actuator 36 begins to operate secondary throttle valves 34 at point "A", which occurs at a calculated engine speed $N_1$, then by the time secondary throttle valves 34 are fully moved to the "SO" position, engine speed may increase to $N_2$. As a result, the aforementioned torque bump may occur, shown as the difference between $T_1$ and $T_2$. According to the present invention, as will be more fully described with reference to FIG. 3, controller 42 predicts the optimum transition point at which secondary throttle valves 34 transition completely to the appropriate position. Controller 34 then initiates operation of actuator 36 to operate secondary throttle valves 34 at a point before the optimum transition point, shown at point "B" in FIG. 2. Thus, by the time secondary throttle valves 34 are fully moved to the "SO" position, engine speed increases from $N_3$ to $N_1$ such that engine 10 smoothly transitions between operating conditions.

Figure 3:
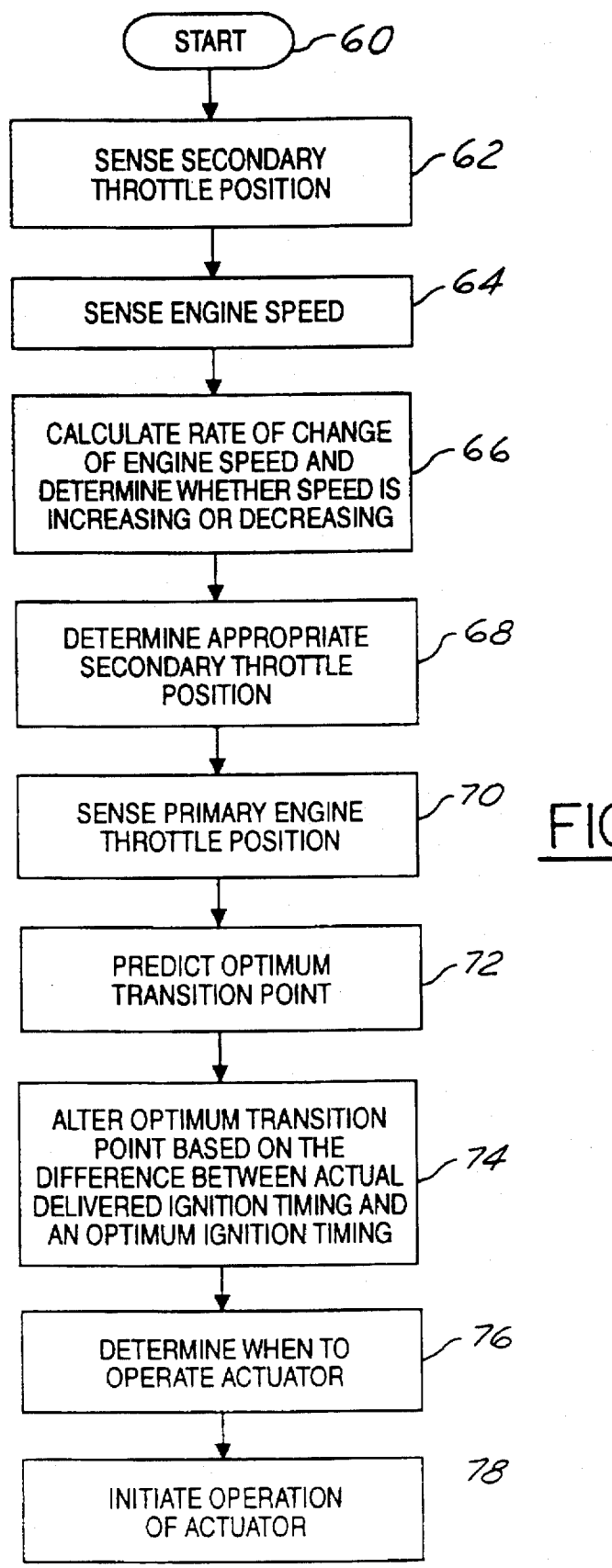
FIG. 3 is a flow chart showing operation of an intake system according to one aspect of the present invention.

Turning now to FIG. 3, operation of the present system begins with enablement of the strategy at block 60. At block 62, the current position of secondary throttle valve is sensed. The position of secondary throttle valve may be determined by a variety of methods and structures known to those skilled in the art and suggested by this disclosure. For example, a rotary potentiometer, such as used in throttle positioning in electronically controlled internal combustion engines, may be employed. At block 64, the engine speed is sensed for at least two discrete points in time. At block 66, the rate of change of engine speed, dN/dt, is calculated. This rate is used to predict the optimum transition point, to determine at what point to actuator 36 begins to operate secondary throttle valves 34, and whether the engine speed is increasing or decreasing, as will be further described with reference to FIGS. 5 and 6. At block 68, controller 42 determines an appropriate secondary throttle position. That is, controller 42 determines whether secondary throttle valves 34 should be moved from the present position. At block 70, controller 42 senses the position of primary engine throttle 32 using, for example, a rotary potentiometer. At block 72, controller 42 predicts the optimum transition point when actuator 36 completely moves secondary throttle valve 34 between "SC" and "SO".

Continuing now with reference to FIGS. 3 and 4, at block 74, controller 42 may alter the optimum transition point due to changes in ambient air temperature and engine temperature because temperature changes effects the ignition timing to minimize engine knock. The optimum transition point then may be altered based on a difference between the actual delivered ignition timing (SPK_ACT) and the optimum ignition timing for best torque (SPK_MBT). SPK_MBT, shown in FIG. 4, represent the crank angle when the in cylinder charge is ignited to obtain maximum torque. Those skilled in the art will recognize in view of this disclosure that SPK_MBT depends upon various engine operating parameters such as engine speed, engine load, spark timing, EGR rate, fuel delivery rate, engine air charge temperature, engine coolant temperature, intake manifold absolute pressure, the operating position of secondary throttle valves, the operating position of primary engine throttle valve, vehicle gear selection, vehicle speed, intake manifold air mass flow rate, accelerator position, and other parameters known to those skilled in the art and suggested by this disclosure. The inventors of the present invention have determined that SPK_MBT is also dependent upon the operating position of secondary throttle valves. It has been found that SPK_MBT is more advanced for the "SO" position than the "SC" position. According to the present invention, the optimum transition point may be altered, based on the difference between SPK_MBT and SPK_ACT, where SPK_ACT is often retarded from SPK_MBT to reduce engine knock, especially at high temperatures. That is, SPK_ACT is retarded at elevated temperatures to reduce engine knock, which also results in less torque. The reason the optimum transition point is altered is because, under fast burn conditions (with the secondary throttle in the "SC" position), the loss in torque due to temperature increase and engine knock is less severe. Thus, the effect of temperature is greater when the secondary throttles are in the "SO" position. As a result, the engine speed at which the optimum transition point occurs is higher when in the elevated temperature condition.

Continuing with FIG. 3, at block 76, controller 42 determines when to operate actuator 36, and at block 78, controller 42 operates actuator 36. According to the present invention, controller 42 signals actuator 36 to initiate moving the secondary throttle valves 34 at a point before the optimum transition point. In the example described herein, controller 42 calculates an engine speed (i.e. the optimum transition point) when secondary throttle valves 34 should be completely moved between the "SO" and "SC" positions, shown as $N_1$ in FIG. 2. Then, using the calculated engine speed rate, dN/dt, controller 42 determines the engine speed, shown as $N_3$ in FIG. 2, at which to initiate operation of actuator 36. Thus, controller 42 initiates operation of actuator 36 at a point before the optimum transition point such that a smooth torque transition occurs between engine operating conditions.

Turning now to FIGS. 5 and 6, there is shown graphs of primary engine throttle position versus engine speed. The graphs also show when the secondary throttle valves 34 are in the "SC" or "SO" positions. Referring in particular to FIG. 5, it can be seen that the "SC" and "SO" positions are independent of primary engine throttle position. Here, the optimum transition between the "SC" and "SO" positions occurs at a calculated engine speed, as discussed above. According to the present invention, the optimum transition point is different depending upon whether the engine speed is increasing or decreasing. Thus, when engine speed is increasing, as determined by controller 42, the optimum transition point occurs at $N_{10}$. However, when engine speed is decreasing, the optimum transition point occurs at $N_{11}$. This creates a desired hysteresis, shown as cross-hatched area $H_1$ in FIG. 5. Without hysteresis, the secondary throttle valves 34 may be alternately switched between "SC" and "SO" if the engine is operating at or near the transition point. This phenomenon is known as "hunting", which the hysteresis is designed to overcome.

In FIG. 6, the "SC" and "SO" positions are shown to be dependent upon primary engine throttle position. That is, the optimum transition point depends upon whether the engine speed is increasing or decreasing and also depends upon the position of the primary engine throttle. Thus, for example, at wide open throttle (shown as "WOT"), the optimum transition point from "SC" to "SO" occurs at $N_{20}$ whereas, at less than wide open throttle (shown as "TP"), the optimum transition point from "SC" to "SO" occurs at $N_{21}$. As discussed with reference to FIG. 5, a hysteresis may also be provided. Thus, at "TP", when engine speed is decreasing, the optimum transition point occurs at $N_{22}$, rather than $N_{21}$, thereby creating the desired hysteresis, shown as cross-hatched area $H_2$ in FIG. 6.

While the best mode for carrying out the invention has been described in detail, those skilled in the art in which this invention relates will recognize various alternative designs and embodiments, including those mentioned above, in practicing the invention that has been defined by the following claims.

We claim:

1. An intake system for a multicylinder internal combustion engine, comprising:

a manifold having a plurality of inlet runners for conducting charge air into the cylinders of an engine;

at least one secondary throttle valve situated within at least one of said inlet runners;

an actuator for positioning said at least one secondary throttle valve;

at least one sensor for sensing at least one operating parameter of said engine; and, a controller for operating said actuator so as to move said secondary throttle valve between a first, relatively restricting position, and a second, relatively unrestricting position, with said controller receiving a sensed value from said sensor, determining an appropriate position for said secondary throttle valve, predicting an optimum transition point at which said secondary throttle valve transitions to said appropriate position and thereafter initiating operation of said actuator at a point before said transition point such that the engine smoothly transitions between engine operating conditions.

2. An intake system according to claim 1 further comprising an engine speed sensor for sensing engine speed, with said controller predicting said optimum transition point by receiving sensed values from said engine speed sensor indicative of engine speeds, calculating a rate of change of engine speed over time based on said sensed values and thereafter calculating an engine speed which is representative of the point before said transition point when said controller initiates operation of said actuator.

3. An intake system according to claim 1 further comprising at least one secondary throttle valve position sensor for sensing the position of said at least one secondary throttle valve, with said controller receiving a sensed value from said at least one secondary throttle valve position sensor which is representative of secondary throttle valve position.

4. An intake system according to claim 2 wherein said controller determines whether engine speed is one of increasing and decreasing, with said optimum transition point being different depending upon whether said engine speed is one of increasing and decreasing so as to form a hysteresis.

5. An intake system according to claim 1 further comprising a primary engine throttle valve for controlling charge air within said manifold, and a primary engine throttle position sensor for sensing primary engine throttle position, with said controller predicting said optimum transition point based on a sensed value from said primary engine throttle position sensor indicative of primary engine throttle position.

6. An intake system according to claim 1 wherein said secondary throttle valve is completely transitioned to said appropriate position when the engine is operating at said predicted optimum transition point.

7. An intake system according to claim 1 wherein said controller alters said optimum transition point based on ambient air temperature and engine temperature.

8. An intake system according to claim 7 wherein said controller provides an actual delivered ignition timing, with said controller altering said optimum transition point based on a difference between said actual delivered ignition timing and an optimum ignition timing, with said optimum ignition timing representing an ignition timing for maximum torque.

9. An intake system for a multicylinder internal combustion engine, comprising:

a manifold having a plurality of inlet runners for conducting charge air into the cylinders of an engine;

at least one secondary throttle valve situated within at least one of said inlet runners;

at least one secondary throttle valve position sensor for sensing the position of said at least one secondary throttle valve;

an actuator for positioning said at least one secondary throttle valve;

an engine speed sensor for sensing engine speed; and a controller for operating said actuator so as to move said secondary throttle valve between a first, relatively restricting position, to a second, relatively unrestricting position, with said controller receiving sensed values from said engine speed sensor which is representative of engine speeds and from said at least one secondary throttle valve position sensor which is representative of position of said at least one secondary throttle valve, calculating a rate of change of engine speed over time based on said sensed values, determining an appropriate position for said secondary throttle valve, determining an optimum transition point between said first and said second positions, calculating an engine speed which is representative of an engine speed point before said transition point and thereafter initiating operation of said actuator at said engine speed point such that the engine smoothly transitions between engine operating conditions.

10. An intake system according to claim 8 wherein said controller determines whether engine speed is one of increasing and decreasing, with said optimum transition point being different depending upon whether said engine speed is one of increasing and decreasing so as to form a hysteresis.

11. An intake system according to claim 10 wherein said controller alters said optimum transition point based on ambient air temperature and engine temperature.

12. An intake system according to claim 11 wherein said controller provides an actual delivered ignition timing, with said controller altering said optimum transition point based on a difference between said actual delivered ignition timing and an optimum ignition timing, with said optimum ignition timing representing an ignition timing for maximum torque.

13. An intake system according to claim 9 wherein said actuator is an electrically driven motor.

14. An intake system according to claim 9 wherein said actuator is an engine manifold vacuum driven motor.

15. An intake system according to claim 9 further comprising a primary engine throttle valve for controlling charge air within said manifold, and a primary engine throttle position sensor for sensing primary engine throttle position, with said controller predicting said optimum transition point based on a sensed value from said primary engine throttle position sensor which is representative of primary engine throttle position.

16. A method for controlling the operation of secondary throttle valves in an engine, the engine having a manifold having a plurality of inlet runners for conducting charge air into the cylinders of the engine, at least one secondary throttle valve situated within at least one of the inlet runners, and an actuator for positioning the secondary throttle valve, with said method comprising the steps of:

sensing at least one operating parameter of said engine;

determining an appropriate position for said secondary throttle valve;

predicting an optimum transition point at which said throttle valve transitions to said appropriate position; and, initiating operation of said actuator at a point before said transition point so as to move the secondary throttle valve between a first, relatively restricting position, and a second, relatively unrestricting position such that the engine smoothly transitions between a first operating condition and a second operating condition.

17. A method according to claim 16 wherein said predicting step comprises the steps of:

receiving sensed values which are representative of engine speeds;

calculating a rate of change of engine speed over time based on said sensed values; and, calculating an engine speed representing the point before said transition point when said controller initiates operation of said actuator.

18. A method according to claim 17 wherein said predicting step comprises the steps of:

determining whether said calculated engine speed is one of increasing and decreasing; and, providing a different optimum transition point depending upon whether said engine speed is one of increasing and decreasing so as to form a hysteresis.

19. A method according to claim 17 further comprising the step of altering said optimum transition point based on ambient air temperature and engine temperature.

20. A method according to claim 17 further comprising the steps of:

providing an actual delivered ignition timing; and, altering said optimum transition point based on a difference between said actual delivered ignition timing and an optimum ignition timing, with said optimum ignition timing representing an ignition timing for maximum torque.

* * * * *